United States Patent [19]

Nalewajek et al.

[11] Patent Number: 4,548,881
[45] Date of Patent: Oct. 22, 1985

[54] HIGH ENERGY DENSITY BATTERY WITH CATHODE COMPOSITION

[75] Inventors: David Nalewajek, West Seneca; Richard E. Eibeck, Orchard Park; Bernard Sukornick, Williamsville, all of N.Y.

[73] Assignee: Allied Corporation, Morris Township, Morris County, N.J.

[21] Appl. No.: 699,765

[22] Filed: Feb. 8, 1985

[51] Int. Cl.$^4$ .................................... H01M 6/14
[52] U.S. Cl. ............................ 429/194; 429/197; 429/218
[58] Field of Search ........ 429/194, 196, 197, 191–193, 429/218

[56] References Cited

U.S. PATENT DOCUMENTS

| | | | |
|---|---|---|---|
| 2,786,874 | 3/1957 | Teeters et al. | 260/653 |
| 3,514,337 | 5/1970 | Braeuer | 429/194 |
| 3,536,532 | 10/1970 | Watanabe et al. | 429/194 |
| 3,700,502 | 10/1972 | Watanabe et al. | 136/6 |
| 3,892,590 | 7/1975 | Gunther | 429/218 X |
| 4,105,836 | 8/1978 | Almerini | 429/194 |
| 4,247,608 | 1/1981 | Watanabe | 429/194 |
| 4,327,166 | 4/1982 | Leger | 429/194 |

FOREIGN PATENT DOCUMENTS 759173 10/1956 United Kingdom .

*Primary Examiner*—Charles F. LeFevour
*Attorney, Agent, or Firm*—Arthur J. Plantamura; Jay P. Friedenson

[57] ABSTRACT

A cell which employs an active metal anode such as lithium and a liquid organic electrolyte that is improved by the use of a cathode comprised of carbon fluoride chloride is described.

The cathode comprises a carbon fluoride chloride of the general formula $(C_yF_xCl_z)_n$ wherein y is 1 to 2, x is greater than 0 to 1.2, z is $\leq 0.1$ and n defines the number of repeating units occurring in the carbon fluoride chloride molecule of high molecular weight. The resulting battery has improved discharge and shelf-life characteristics.

16 Claims, 3 Drawing Figures

HIGH ENERGY DENSITY BATTERY WITH CATHODE COMPOSITION

DESCRIPTION

This invention relates to novel high energy density non-aqueous batteries exhibiting superior electrochemical properties. More particularly, the invention relates to an improvement in the performance of non-aqueous cells utilizing an active metal anode, a liquid organic electrolyte and an improved cathode material. Specifically, the improved cathode is comprised of carbon fluoride chloride of general formula $(C_yF_xCl_z)_n$ wherein y is 1 or 2, x is greater than 0 and up to 1.2, z is $\leq 0.1$ and n defines the number of repeating units occurring in this molecule of high molecular weight. Batteries employing the improved cathode have improved discharge and shelf-life characteristics.

BACKGROUND OF THE INVENTION

It is known in the prior art that carbon fluoride compounds of the type, $CF_x$, are active cathode materials in non-aqueous cells. Particular interest has centered on systems employing this cathode material, a non-aqueous electrolyte and a highly active metal anode such as lithium or sodium.

As an example of such a system, Braeuer et al. have disclosed in U.S. Pat. No. 3,514,337 a high energy density battery composed of carbon fluoride of the general formula $(C_xF)_n$, wherein x lies in the range of 3.5 to 7.5, and a non-aqueous electrolyte. This translates to an x range of 0.1 to 0.28 using the general form of the equation, $CF_x$, as stated above.

In the Watanabe, et al., U.S. Pat. No. 3,536,532 the patentees describe a high energy density battery utilizing $CF_x$ where x falls in the range of 0.5 to a maximum of 1. The carbon fluoride cathode material prepared from crystalline carbon (i.e. graphite), exhibited higher energy densities and improved discharge performance when compared to $(C_xF)_n$. Additional disclosure by Watanabe, et al., in U.S. Pat. No. 3,700,502 describes also a high energy density system employing carbon fluoride of the type $CF_x$ wherein x is in the range of greater than 0 and up to 1 and is prepared from amorphous carbon sources such as charcoal, activated carbon or coke. These cells exhibited extended shelf life due to the stability of the carbon fluoride in the electrolyte. In both of these systems, the electrolyte was a non-aqueous solution of an organic solvent (i.e. propylene carbonate and the like) and lithium perchlorate. The anode active material is an alkali metal such as lithium or sodium.

Another cell which is composed of carbon fluoride that has an x value of greater than 1 and up to and including 2 is described in Gunther U.S. Pat. No. 3,892,590. The materials of that patent are described as exhibiting higher energy densities than the prior art due to the increase fluorine content.

In accordance with the present invention, a novel cathode composition is provided comprising the electrochemical activity of carbon fluoride chloride, $(C_yF_xCl_z)_n$. We have discovered that this material offers substantial improvements in discharge characteristics over prior art fluorinated carbon electrode compositions when used as an active cathode material in a non-aqueous cell. The several features and advantages of the novel cathode composition of the invention will become apparent from the description in greater detail which follows.

SUMMARY OF THE INVENTION

The novel cathode composition of the invention comprises a carbon fluoride chloride compositions of the formula:

$(C_yF_xCl_z)_n$ wherein y ranges from 1 or 2, x is greater than 0 and ranges upto about 1.2 and z is greater than 0 up to 0.1 and n refers to the monomer units which can vary widely. The cathode permits the provision, in conjunction with an anode and an organic electrolyte solution, of a unique high enrgy density non-aqueous cell. In the preferred embodiments, the y value will range from about 0.80 to 1.1, the x value will range from about 0.7 to 1.1, and the z value will range from at least about 0.001 to 0.1. Amongst the preferred embodiments most especially advantageous are those in which $y = 0.9$ to 1.1, $x = 0.75$ to 1 and $z = 0.002$ to 0.01. This range of values will improve the performance of the battery by extending the ampere-hour capacity and/or watt-hour capacity delivered at a particular rate. This results in higher operating discharge voltages as well as delivered energy per unit time and renders these cells more acceptable for a wider range of applications. Additionally, the use of carbon fluoride chloride improves the pulse voltage capability at high drain rate beyond that obtainable with carbon fluoride. A particularly important feature of this material is the high voltage observed at the onset of discharge. Prior art $CF_x$ batteries exhibits a closed circuit voltage during the initial 10% of discharge which is lower than the closed circuit voltage during later stages. This phenomenon is referred to as the closed circuit suppression voltage (CCVs). This characteristic often adversely impacts applications and limits the use of $CF_x$ in commercial applications. The carbon fluoride chloride cathode of this invention obviates this adverse effect and opens up new applications as discussed below in greater detail.

DESCRIPTION OF THE PREFERRED EMBODIMENTS

Figure 1:
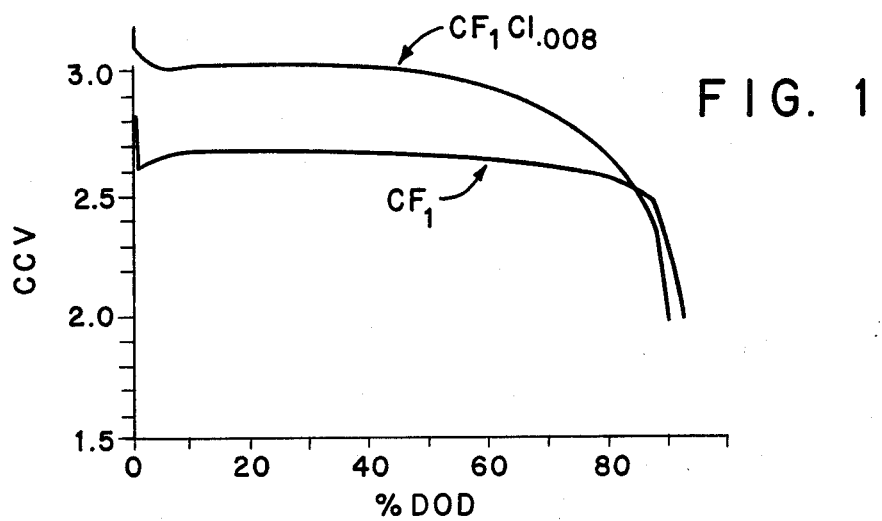
FIG. 1, FIG. 2, and FIG. 3 depict representative graphs of voltage versus % depth of discharge and show discharge curves for cells employing the compositions of this invention in relationship to standard $CF_x$ cells at various drain rates.

The invention provides a novel high energy density non-aqueous cell which exhibits superior electrochemical properties and in which the cathode composition is comprised of carbon fluoride chloride. The novel cathode composition permits the provision of a novel high energy non-aqueous cell comprising an anode, an organic electrolyte solution and a cathode, said cathode comprised of carbon fluoride chloride, $(C_yF_xCl_z)_n$ wherein y ranges from about 1 or 2; x is greater than 0 and ranges up to about 1.2 and z is greater than 0 and ranges up to about 0.1 and n refers to the monomer units which may vary over a fairly wide range.

The carbon fluoride chloride is composed of carbon, fluorine and chlorine wherein the carbon can be chosen in the form of graphite, coke, needle coke, charcoal, activated carbon, carbon black and the like. Preferably, the carbon fluoride chloride is produced from a needle coke. The carbon fluoride chloride composition described herein may be made by several ways as described in the prior art. For example, carbon can be treated with chlorine monofluoride, ClF, to produce $(C_yF_xCl_z)_n$ or with mixtures of chlorine, $Cl_2$, and fluorine, $F_2$, to produce $(C_yF_xCl_z)_n$. These procedures are described in greater detail, for example, in British Pat. No. 759,173 and in U.S. Pat. No. 2,786,874 the methods of which are hereby incorporated by reference.

In the practice of this invention, the carbon fluoride chloride used to fabricate the cathode could have a y value of up to 2, an x value of greater than 0 and up to about 1.2 and a z value of greater than 0 and up to about 0.1. In the more preferred embodiments of the present invention, the value of y may vary from about 0.80 to about 1.0, the value of x from about 0.7 to about 1.1, and the value of z from about 0.001 to about 0.1. The value of n in the above formula may vary over a fairly broad range. As contemplated in the practice of this invention, n as acknowledged in the prior art may comprise an indefinitely large number. The large value attributed to "n" in fluorinated carbonaceous materials is acknowledged in the prior art. The value of "n" may vary from 1 to about 100,000 and infinitely higher repeating units, i.e. n may be defined as the number of repeating units in the range of $1 \geq n >> 10^5$. Amongst the particular embodiments most preferred are those in which y ranges from about 0.8 to about 1.2, x ranges from about 0.70 about to 1.1 and z ranges from about 0.001 to about 0.01. This range of values will improve the performance of the battery by extending the ampere-hour capacity and/or watt-hour capacity delivered at a particular rate.

This results in higher operating discharge voltages as well as delivered energy per unit time. Thus, these cells are rendered more acceptable for a wider range of application. It has been observed as shown by reference to the figures of the drawing that voltage output at various drain rates is improved over 300 mV when compared to carbon fluoride, $CF_x$. It has also been observed that the use of carbon fluoride chloride will improve the pulse voltage capability at high drain rate beyond that obtainable with carbon fluoride. A particularly important feature of the carbon fluoride chloride composition cathode of the invention is the high voltage observed at the onset of discharge. With prior art fluorinated carbon compositions, the closed circuit voltage of $Li/CF_x$ battery during the initial 10% of discharge is lower than the closed circuit voltage during the later stages. This temporary drop in cell voltage is commonly referred to as the closed circuit suppression voltage (CCVs). This characteristic adversely impacts applications for uses of such batteries. For example, the voltage at "beginning of life" (2.3 V, FIG. 2) is as low as the voltage indicating "end of life" complicating the design of circuitry to indicate "end of life". As a consequence, it has been determined that many potential users are unable to incorporate these cells in their equipment.

To circumvent this problm and minimize the degree of voltage suppression, present commercial practice involves discharging batteries as much as 10% at the time of manufacturing. While this minimizes the phenomenon, its does not completely eliminate the problem of low voltage during the initial stages of discharge. The present practice suffers from several disadvantages: an additional step is required in production thereby increasing the cost of the battery; and a decrease in capacity of the relatively expensive $CF_x$ raw material is lost in this pre-discharge step.

The abolition of this additional manufacturing step thus increases the economics of production of $Li/CF_x$ related batteries as well as eliminates the adverse impacts inherent to current state of the art $CF_x$ batteries.

We have observed that carbon fluoride chloride shifts the initial voltage to a high enough potential (2.73 v, see FIG. 2) that it no longer poses a probelm during high drain rate applications. Thus, predischarging the cell is no longer required. Concurrently, a reduction in manufacturing costs and an increase in available energy per gram of material is realized. The high voltage exhibited by this material potentially opens up areas for new application since it is no longer in the "end of life" region.

Electrolyte solvents used in the practice of this invention are well known to those skilled in the art and can include the following classes of compounds:

Lactones: eg. $\gamma$-butyrolactone,

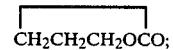

Alkylene carbonates: eg. propylene carbonate,

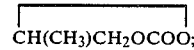

Lactams: eg. N-methylpyrrolidinone,

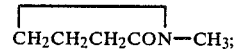

Polyethers: eg. 1,1 and 1,2 dimethoxyethane;
Cyclic ethers: eg. tetrahydrofuran;
Cyclic sulfones: eg. sulfolane

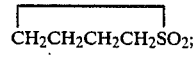

Dialkylsulfites: eg. dimethylsulfite;
Monocarboxylic acid esters: eg. ethyl or methyl acetate, methyl formate; and
Alkylnitriles: eg. acetonitrile Of the above, the preferred solvents are $\gamma$-butyrolactone, propylene carbonate, acetonitrile, dimethylsufite, 1,2 dimethoxyethane and sulfolane. Of these, the most preferred are 1,2 dimethoxyethane, propylene carbonate, equi-volume mixtures of 1,2-dimethoxyethane/propylene carbonate and $\gamma$-butryrolactone. As such these solvents are more chemically inert to battery components and result in higher utilization of the cathode material.

The electrolytes for use in the application of this invention are selected from those salts which will produce an ionically conductive solution in the organic solvents sited above. Useful electroyltes include $LiBF_4$, $LiClO_4$, and like.

The anode material employed in conjunction with the cathode material described in this invention consists of electrochemically active metals well known to those skilled in the art. These can include lithium, sodium, magnesium, and the like. Lithium is preferentially used because of its greater activity with the cathode described herein.

A separator is also employed in the construction of cells utilizing carbon fluoride chloride as described in this invention. The separator must be chemically inert to the materials present and that it must have sufficient porosity to permit diffusion of the electrolyte in order to establish ion transfer betwen the cathode and anode. Separator matrial such as polypropylene and the like is commercially available and well known to those skilled in the art.

The container for the cell must be made of a material which is chemically inert to the other materials present. Suitable materials are stainless steel and the like.

The insulating component of the cell between the cover and the can, can be chosen from materials known to those skilled in the art. These consist of materials such as polytetrafluoroethylene, fluorinated ethylene propylene (FEP), tetrafluoroethylene, polyethylene, etc.

The several features and advantages of the invention will be apparent in greater detail by the following examples. It will be understood, however, that although these samples may describe in detail certain preferred conditions of the invention, they are given primarily for purposes of illustration and the invention in its broad aspects is not limited thereto.

EXAMPLE 1

(General Procedure)

Carbon fluoride chloride was prepared by passing a 20% gas mixture consisting of 2:1 by volume mixture of $Cl_2/F_2$ gas, 80% nitrogen, over a bed of carbon maintained at 425° C. Various carbons, including specifically, needle coke, the carbon blacks, activated carbon carbon blacks and graphite were employed. After 9-12 hours, the light brown residue which is produced analyzes as $CF_1Cl_{0.008}$. Material prepared in this manner was used for construction of cells as described in the examples which follow.

EXAMPLE 2

An experimental cell was constructed using a lithium anode, 1M $LiBF_4$ electrolyte in 50/50 dimethoxyethane/propylene carbonate and a cathode consisting of 83-85% by weight of $CF_1Cl_{0.008}$. The cathode material used in these examples was prepared from a needle coke carbon, 12-13% by weight acetylene black and 3-5% by weight of poly(tetrafluoroethylene). The cell was discharged across a 10 K$\Omega$ load corresponding to a cathodic current density of 0.36 mA/cm$^2$. FIG. 1 is a plot of observed closed circuit voltage (CCV) versus depth of discharge (DOD) and compares $CF_1$ to $CF_1Cl_{0.008}$. Table 1 summarizes the pertinent electrochemical data.

TABLE 1

| MATERIAL | CCV @ various % DOD | | | ENERGY mWH/g |
|---|---|---|---|---|
| | 20% | 50% | 66.7% | |
| $CF_1$ | 2.68 | 2.66 | 2.63 | 2086 |
| $CF_1Cl_{.008}$ | 3.05 | 2.98 | 2.83 | 2188 |

EXAMPLE 3

Figure 2:
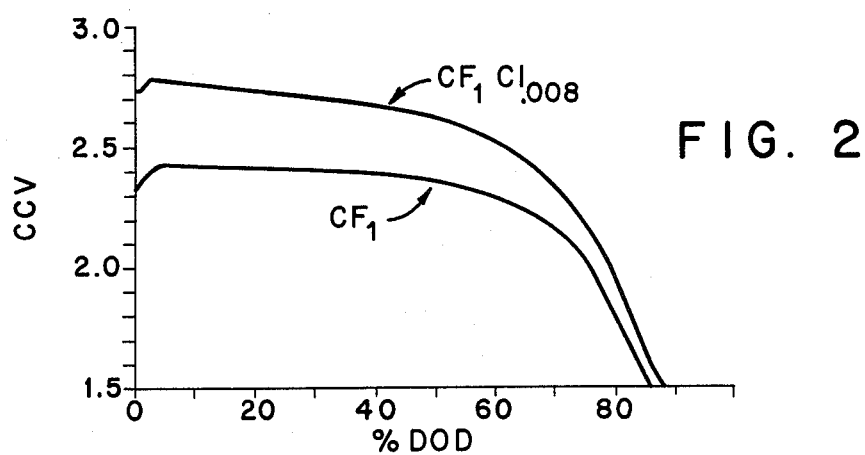

An experimental cell was constructed as described in Example 2 and was discharged across a 1 K$\Omega$ load corresponding to a cathodic current density of 2.4 mA/cm$^2$. FIG. 2 is a plot of observed voltage versus depth of discharge and compares $CF_1$ to $CF_1Cl_{0.008}$. Table 2 summarizes the pertinent electrochemical data.

TABLE 2

| MATERIAL | CCVs* | CCV @ various % DOD | | | ENERGY mWH/g |
|---|---|---|---|---|---|
| | | 20% | 50% | 66.7% | |
| $CF_1$ | 2.33 | 2.42 | 2.36 | 2.21 | 1716 |
| $CF_1Cl_{.008}$ | 2.73 | 2.72 | 2.62 | 2.42 | 1935 |

*closed circuit supression voltage

EXAMPLE 4

Figure 3:
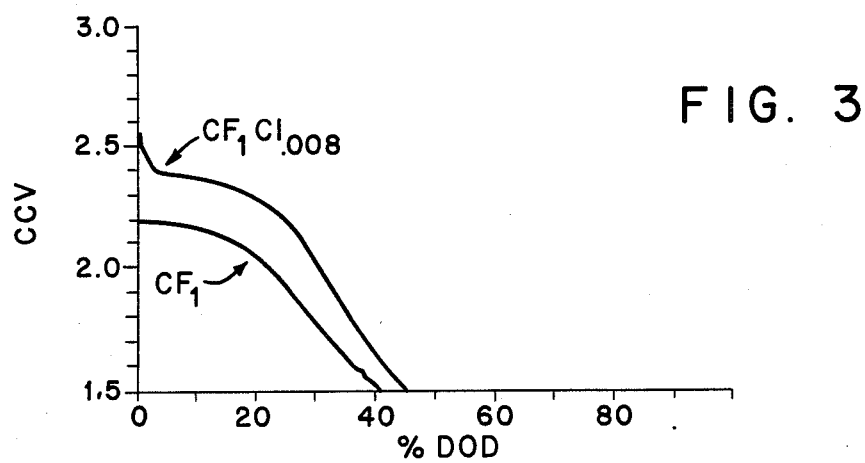

An experimental cell was constructed as described in Example 2 and was discharged across a 0.3 K$\Omega$ load corresponding to a cathodic current density of 10 mA/cm$^2$. FIG. 3 is a plot of observed voltage versus depth of discharge and compares $CF_1$ to $CF_1Cl_{0.008}$. Table 3 summarizes the pertinent electrochemical data.

TABLE 3

| MATERIAL | CCV | ENERGY mWH/g |
|---|---|---|
| $CF_1$ | 2.17 | 709 |
| $CF_1Cl_{.008}$ | 2.38 | 843 |

As evident from the data obtained from the above examples, the cells of this invention delivered higher voltage at all drain rates, delivered more energy expressed as milliwatt hours per gram of material and shifted the closed circuit suppression voltage to a high enough potential to render these cells more acceptable for a wider range of applications during high drain rate conditions.

It will be understood that variations may be made in the several conditions and ranges disclosed and that the disclosed limitations are provided primarily to better describe the invention and should not be regarded as limitations except as set forth in the claims which follow.

What is claimed is:

1. A high energy density battery comprising (a) a negative electrode having as the active material an electrochemically active metal; (b) a non-aqueous liquid electrolyte; and (c) a positive electrode the improvement which comprises: a positive electrode (c) having as its principal active material a chlorofluorinated carbon represented by the formula $(C_yF_xCl_z)_n$ wherein y ranges from 1 to 2, x is greater than 0 and up to 1.2, z is at least 0.001 and ranges up to 0.1 and n is the number of repeating units in the range of $1 \geq n >> 10^5$.

2. The battery of claim 1, wherein x has a value of 0.7 to 1.1.

3. The battery of claim 1 wherein y has a value of 0.8 to 1.0.

4. The battery of claim 1 wherein z has a value of 0.001 to 0.01.

5. The battery of claim 1 wherein x has a value of 0.7 to 1.1 and y has a value of 0.8 to 1.0.

6. The battery of claim 1 wherein x has a value of 0.7 to 1.1 and z has a value of 0.001 to 0.01.

7. The battery of claim 1 where y has a value of 0.8 to 1.0 and z has a value of 0.001 to 0.01.

8. The battery of claim 1 where x has a value of 0.7 to 1.1, y has a value of 0.8 to 1.0, and z has a value of 0.001 to 0.01.

9. The battery according to claim 1 wherein the carbon of (c) is selected from the group consisting of graphite, coke, carbon black, needle coke, charcoal and activated carbon.

10. The battery according to claim 1 wherein the carbon of (c) is needle coke.

11. The battery of claim 1 wherein the non-aqueous electrolyte comprises a solution of a lithium salt and an organic solvent selected from the group consisting of lactones, alkylene carbonates, lactams, polyethers, cyclic ethers, cyclic sulfones, dialkylsulfites, monocarboxylic acid esters and alkylnitriles.

12. The battery of claim 11 wherein the organic solvent is γ-butyrolactone.

13. The battery of claim 11 wherein the organic solvent is dimethoxyethane.

14. The battery of claim 11 wherein the organic solvent is propylene carbonate.

15. The battery of claim 11 wherein the organic solvent is a 50/50 mixture by volume of dimethoxyethane/propylenecarbonate.

16. The battery of claim 1 wherein the non-aqueous electrolyte is selected from the group consisting of lithium tetrafluoroborate, lithium perchlorate and lithium hexafluoroarsenate.

* * * * *